(12) United States Patent
Egawa et al.

(10) Patent No.: US 8,187,763 B2
(45) Date of Patent: May 29, 2012

(54) COOLING LIQUID COMPOSITION FOR FUEL CELL

(75) Inventors: Hiroshi Egawa, Seki (JP); Nobuyuki Kaga, Seki (JP); Tsuyumi Takashiba, Wako (JP); Shiro Yagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 12/046,244

(22) Filed: Mar. 11, 2008

(65) Prior Publication Data

US 2008/0166615 A1 Jul. 10, 2008

Related U.S. Application Data

(63) Continuation of application No. 11/330,015, filed on Jan. 11, 2006, now abandoned, which is a continuation of application No. PCT/JP03/16646, filed on Dec. 24, 2003.

(30) Foreign Application Priority Data

Jul. 11, 2003 (WO) ...................... PCT/JP03/008879

(51) Int. Cl.
H01M 8/04 (2006.01)
(52) U.S. Cl. .......... 429/437; 429/433; 429/434; 429/436
(58) Field of Classification Search .................. None
See application file for complete search history.

(56) References Cited

U.S. PATENT DOCUMENTS

| | | | |
|---|---|---|---|
| 2,307,577 A | 1/1943 | Downing | |
| 2,595,547 A | 11/1960 | Brillhart | |
| 2,959,547 A | 11/1960 | Brillhart | |
| 3,362,910 A | 1/1968 | Hermann et al. | |
| 3,729,393 A | 4/1973 | Lyde | |
| 4,105,405 A | 8/1978 | Wehle et al. | |
| 4,105,581 A | 8/1978 | Sexsmith | |
| 4,320,025 A | 3/1982 | Diebel | |
| 4,351,796 A | 9/1982 | Marshall | |
| 4,404,113 A | 9/1983 | Peters et al. | |
| 4,418,231 A | 11/1983 | Pamer | |
| 4,600,524 A | 7/1986 | Cuisia et al. | |
| 4,647,392 A | 3/1987 | Darden et al. | |
| 4,689,165 A | 8/1987 | Kardos et al. | |
| 4,740,869 A | 4/1988 | Morimoto et al. | |
| 4,806,310 A | 2/1989 | Mullins et al. | |
| 4,851,145 A | 7/1989 | Van Neste et al. | |
| 5,042,986 A | 8/1991 | Kitchens et al. | |
| 5,080,818 A | 1/1992 | Tachiiwa et al. | |
| 5,100,571 A | 3/1992 | Hartman et al. | |
| 5,269,956 A | 12/1993 | Miller et al. | |
| 5,364,549 A | 11/1994 | McDonogh | |
| 5,387,360 A | 2/1995 | Uekusa et al. | |
| 5,417,819 A | 5/1995 | Askin et al. | |
| 5,454,967 A | 10/1995 | Pfitzner et al. | |
| 5,501,811 A * | 3/1996 | Flaningam et al. | ........... 510/411 |
| 5,723,061 A | 3/1998 | Ciardi et al. | |
| 5,766,506 A | 6/1998 | Mendoza et al. | |
| 5,772,912 A | 6/1998 | Lockyer et al. | |
| 5,851,419 A | 12/1998 | Miyake et al. | |
| 6,040,073 A | 3/2000 | Okamoto | |
| 6,042,955 A | 3/2000 | Okamoto | |
| 6,080,331 A | 6/2000 | Meszaros et al. | |
| 6,214,486 B1 | 4/2001 | Okamoto | |
| 6,280,651 B1 | 8/2001 | Wojtczak et al. | |
| 6,284,721 B1 | 9/2001 | Lee | |
| 6,309,559 B1 | 10/2001 | Minks et al. | |
| 6,361,891 B1 | 3/2002 | Breault et al. | |
| 6,391,257 B1 | 5/2002 | Woyciesjes | |
| 6,398,984 B1 | 6/2002 | Maes et al. | |
| 6,503,413 B2 | 1/2003 | Uchiyama et al. | |
| 6,508,951 B1 | 1/2003 | Mori et al. | |
| 6,572,690 B2 | 6/2003 | Rehman et al. | |
| 6,585,933 B1 | 7/2003 | Ehrhardt et al. | |
| 6,646,082 B2 | 11/2003 | Ghosh et al. | |
| 6,676,848 B2 | 1/2004 | Maes et al. | |
| 6,802,988 B1 | 10/2004 | Wenderoth et al. | |
| 6,814,885 B2 | 11/2004 | Woodward et al. | |
| 6,818,147 B2 | 11/2004 | Wenderoth et al. | |
| 6,881,355 B2 | 4/2005 | Hafner et al. | |
| 7,138,199 B2 | 11/2006 | Mohapatra | |
| 7,258,814 B2 | 8/2007 | Egawa et al. | |
| 7,540,974 B2 | 6/2009 | Egawa et al. | |
| 2002/0053655 A1 | 5/2002 | Maes et al. | |
| 2002/0068360 A1 | 6/2002 | Brockbank et al. | |
| 2003/0124259 A1 | 7/2003 | Kodas et al. | |
| 2003/0164470 A1 | 9/2003 | Wenderoth et al. | |

(Continued)

FOREIGN PATENT DOCUMENTS

EP 0048429 3/1982

(Continued)

OTHER PUBLICATIONS

International Search Report for International Application No. PCT/JP2004/004101, Jul. 13, 2004, (2 pgs.).
Mueller, Sherry A. et al., "*Leaching of Ions from Fuel Cell Vehicle Cooling Systms and Their Removal to Maintain Low Conductivity*,"SAE Technical Paper Series, Mar. 3-6, 2003, 7 pgs., Detroit, U.S.A.
International Search Report for International Application No. PCT/JP2003/016647, Apr. 13, 2004, (1 page).
Mueller, Sherry A. et al., "Leaching of Ions from Fuel Cell Vehicle Cooling System and Their Removal to Maintain Low Conductivity,"SAE Technical Paper Series, Mar. 3-6, 2003, 7 pgs., Detroit, U.S.A.
Wickberg, Anders, *Magnesium in the Volvo LCP 2000*, SAE Technical Paper Series, pp. 1-12, Dated Feb. 25-Mar. 1, 1985.
International Search Report for International Application No. PCT/JP2004/004101. Jul. 13, 2004.

*Primary Examiner* — Ula C Ruddock
*Assistant Examiner* — Tony Chuo
(74) *Attorney, Agent, or Firm* — Patterson Thuente Christensen Pederson, P.A.

(57) ABSTRACT

A coolant composition for a fuel cell unit, which contains at least one aliphatic alcohol having unsaturated bonds in the molecules having 2 to 20 carbon atoms each. The coolant composition maintains the electrical conductivity of the coolant at 10 μS/cm or below as well as the fluctuation of the electrical conductivity within the range of 0 to 10 μS/cm.

13 Claims, No Drawings

U.S. PATENT DOCUMENTS

| | | |
|---|---|---|
| 2003/0198847 A1 | 10/2003 | Jeffcoate et al. |
| 2004/0026656 A1 | 2/2004 | Hafner et al. |
| 2004/0072055 A1 | 4/2004 | Getz et al. |
| 2004/0086757 A1* | 5/2004 | Mohapatra ............... 429/26 |
| 2004/0119044 A1 | 6/2004 | Wenderoth et al. |
| 2004/0245493 A1 | 12/2004 | Abe et al. |
| 2005/0040251 A1 | 2/2005 | Daly |
| 2005/0109979 A1 | 5/2005 | Egawa et al. |
| 2005/0130004 A1* | 6/2005 | Blunk et al. ............. 429/26 |
| 2005/0184272 A1 | 8/2005 | Knauf |
| 2005/0244692 A1 | 11/2005 | Egawa et al. |
| 2005/0274925 A1 | 12/2005 | Nishii et al. |
| 2006/0131277 A1 | 6/2006 | Epton et al. |
| 2006/0145120 A1 | 7/2006 | Egawa et al. |
| 2006/0237685 A1 | 10/2006 | Egawa et al. |
| 2006/0237686 A1 | 10/2006 | Egawa et al. |
| 2006/0273283 A1 | 12/2006 | Egawa et al. |
| 2007/0007489 A1 | 1/2007 | Egawa et al. |
| 2007/0075289 A1 | 4/2007 | Egawa et al. |

FOREIGN PATENT DOCUMENTS

| | | |
|---|---|---|
| EP | 0192130 | 2/1986 |
| EP | 0251480 | 5/1987 |
| EP | 0229254 | 7/1987 |
| EP | 0457859 | 11/1991 |
| EP | 0652305 A1 | 10/1995 |
| EP | 0739965 A1 | 10/1996 |
| EP | 0864627 | 9/1998 |
| EP | 0995785 | 4/2000 |
| EP | 1081250 A1 | 3/2001 |
| EP | 0743854 B1 | 6/2001 |
| EP | 1133585 | 9/2001 |
| EP | 1262535 A1 | 4/2002 |
| EP | 1386952 | 2/2004 |
| JP | 62205183 A2 | 9/1987 |
| JP | 1119011 | 5/1989 |
| JP | 02031894 | 2/1990 |
| JP | 2000385772 | 2/1990 |
| JP | 200172967 A | 7/1990 |
| JP | 2292386 | 12/1990 |
| JP | 04117481 | 4/1992 |
| JP | 7173651 A | 7/1995 |
| JP | 08085782 | 4/1996 |
| JP | 10-055812 | 2/1998 |
| JP | 2000008027 A2 | 1/2000 |
| JP | 2000219981 A2 | 8/2000 |
| JP | 2000239658 A | 9/2000 |
| JP | 2001072967 | 3/2001 |
| JP | 2001164244 | 6/2001 |
| JP | 2001279235 | 10/2001 |
| JP | 2002033108 | 1/2002 |
| JP | 2002063922 | 2/2002 |
| JP | 2002 105442 | 4/2002 |
| JP | 2002270472 A | 9/2002 |
| JP | 2002322467 | 11/2002 |
| JP | 2002371270 A2 | 12/2002 |
| JP | 2003100328 | 4/2003 |
| JP | 2003213465 A | 7/2003 |
| JP | 2003-243338 | 8/2003 |
| JP | 2004068155 | 3/2004 |
| JP | 2004143191 A | 5/2004 |
| JP | 2004143473 | 5/2004 |
| SU | 1563936 | 5/1990 |
| WO | WO86/00917 | 2/1986 |
| WO | WO 96/37920 | 11/1996 |
| WO | WO 00/11102 | 3/2000 |
| WO | WO00/22189 | 4/2000 |
| WO | WO 01/23495 A1 | 9/2000 |
| WO | WO 01/02511 A1 | 1/2001 |
| WO | WO 01/32801 | 5/2001 |
| WO | WO 01/47051 | 6/2001 |
| WO | WO 0178505 | 10/2001 |
| WO | WO02/08354 | 1/2002 |
| WO | WO02/090462 | 11/2002 |
| WO | WO 03/033616 | 4/2003 |
| WO | WO 2005/091413 | 3/2004 |
| WO | WO 2004/042856 A1 | 5/2004 |
| WO | WO2004/085566 | 10/2004 |

* cited by examiner

COOLING LIQUID COMPOSITION FOR FUEL CELL

RELATED APPLICATION

This application is a continuation of U.S. patent application Ser. No. 11/330,015 filed Jan. 11, 2006 (now abandoned), which is a continuation of PCT Application No. PCT/JP2003/016646 filed Dec. 24, 2003 which claims priority to PCT Application No. PCT/JP2003/008879 filed Jul. 11, 2003, each of which are hereby incorporated by reference herein.

TECHNICAL FIELD

The present invention relates to a coolant composition for fuel cells, and specifically to such a coolant composition for automobiles. In particular, the present invention relates to a coolant composition that provides an excellent antifreeze property and is capable of maintaining the electrical conductivity of the coolant adequately low for a long period of time.

BACKGROUND TECHNOLOGY

Generally a fuel cell unit which generates electrical power is provided as a stack of a plurality of fuel cells. During power generation, heat is generated from the fuel cells. To cool the fuel cell unit, a cooling plate is inserted between every few fuel cells.

A fluid path for coolant is provided in each cooling plate in order to cool the fuel cell unit.

A coolant for a fuel cell unit circulates within the stack of the fuel cells and cools the fuel cells. If the electrical conductivity of the coolant is "high", the electricity generated in the fuel cells partially flows into the coolant, resulting in loss of electrical power generated in the fuel cell unit.

Conventionally, pure water which is very low in electrical conductivity and thus high in electrical insulation has been used as coolant for fuel cell units.

In the case of a fuel cell system which is used intermittently, such as a fuel cell system for an automobile, the temperature of the coolant is subject to the atmospheric temperature when not in use. When the atmospheric temperature falls below the freezing point, pure water coolant would freeze, potentially leading to physically damaging the cooling plates. The battery performance of the fuel cell system would then deteriorate.

Accordingly, low electrical conductivity and good antifreeze property are required of coolant for fuel cell systems, especially for fuel cell systems of automobiles.

A coolant composition containing a base component of a water-glycol blend and an amine based alkaline additive that works to maintain the electrical conductivity of the coolant low has been proposed (see Japanese Unexamined Patent Publication 2001-164244).

Such a glycol may be oxidized during use, and may produce ionic substances. Such ionic substances raise electrical conductivity of the coolant.

The coolant paths of a fuel cell system are generally provided with an ion exchanger or ion exchange resin to remove such ionic substances.

However, the capacity of the ion exchanger deteriorates as time goes by because the ion exchanger is "consumed" for removal of the ionic substances.

Accordingly, it is an object of the present invention to provide an anti-freeze coolant composition for a fuel cell unit, which is capable of maintaining the electrical conductivity of a coolant low for a long period of time by suppressing generation of ionic substances in the coolant.

DISCLOSURE OF THE INVENTION

In the following, a coolant composition for fuel cells according to the present invention is described in detail. The coolant composition of the present invention is characterized by containing at least one aliphatic alcohol having unsaturated bonds in the molecules thereof. The base component of this coolant composition possesses low electrical conductivity and antifreeze properties. Preferably, the base component contains at least one ingredient selected from the group consisting of water, glycols, saturated alcohols and glycol ethers.

The glycols may be ethylene glycol, diethylene glycol, triethylene glycol, propylene glycol, 1,3-propanediol, 1,3-butanediol, 1,5-pentanediol and hexylene glycol.

The saturated alcohols may be methanol, ethanol, propanol, butanol, pentanol, hexanol, heptanol and octanol.

The glycol ethers may be alkyl ether of polyoxy alkylene glycol, such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether and tetraethylene glycol monobutyl ether.

The aliphatic alcohols possess unsaturated bonds in the molecules, and maintain electrical conductivity low. The electrical conductivity of the coolant according to the present invention is maintained at 10 μS/cm or below, and the fluctuation in electrical conductivity of the coolant during a long use is maintained within the range from 0 μS/cm to 10 μS/cm.

The aliphatic alcohols of the present invention are not easily removed by the ion exchanger used in the cooling system and are capable of keeping the electrical conductivity of the coolant low for a long time. As they are not removed by the ion exchanger, the expected function of the aliphatic alcohols according to the present invention will last long without losing ion exchanging capability.

Preferably, the aliphatic alcohols have 2 to 20 carbon atoms per molecule. The aliphatic alcohols may be selected from allyl alcohol, 2-butene-1-ol, 3-butene-1-ol, 1-butene-3-ol, 2-methyl-2-propene-1-ol, 4-pentene-1-ol, 1-pentene-3-ol, 2-pentene-1-ol, 2-methyl-3-butene-2-ol, 3-methyl-2-butene-1-ol, 3-methyl-3-butene-1-ol, 2-hexene-1-ol, 3-hexene-1-ol, 4-hexene-1-ol, 5-hexene-1-ol, 1-hexene-3-ol, 6-heptene-1-ol, 2-heptene-1-ol, 4-heptene-1-ol, 7-octene-1-ol, 2-octene-1-ol, 3-octene-1-ol, 5-octene-1-ol, 3-octene-2-ol, 1-octene-3-ol, 2-nonene-1-ol, 3-nonene-1-ol, 6-nonene-1-ol, 8-nonene-1-ol, 1-nonene-3-ol, 2-decene-1-ol, 4-decene-1-ol, 9-decene-1-ol, 3,7-dimethyl-6-octene-3-ol, 2-undecene-1-ol, 10-undecence-1-ol, 2-dodecene-1-ol, 2-propyne-1-ol, 2-butyne-1-ol, 1-butyne-3-ol, 3-butyne-1-ol, 1-pentyne-3-ol, 2-pentyne-1-ol, 3-pentyne-1-ol, 4-pentyne-1-ol, 4-pentyne-2-ol, 3-methyl-1-butyne-3-ol, 1-hexyne-3-ol, 3-hexyne-1-ol, 5-hexyne-3-ol, 2-hexyne-1-ol, 5-hexyne-1-ol, 3-methyl-1-pentyne-3-ol, 2-cyclohexene-1-ol, 2,4-hexadiene-1-ol, 1-heptyne-3-ol, 2-heptyne-1-ol, 3-heptyne-1-ol, 4-heptyne-2-ol, 5-heptyne-3-ol, 5-methyl-1-hexyne-3-ol, 3,4-dimethyl-1-pentyne-3-ol, 3-ethyl-1-pentyne-3-ol, 3,5-dimethyl-1-hexyne-3-ol, 3-octyne-1-ol, 1-octyne-3-ol, 2,7-octadienol, 3,6-dimethyl-1-heptyne-3-ol, 3-ethyl-1-heptyne-3-ol, 3-nonyne-1-ol, 2,6-nonadiene-1-ol, 3,6-nonadiene-1-ol, 1-cyclohexyl-2-butene-1-ol, 2-decyne-1-ol, 3-decyne-1-ol, 2,4-decadiene-1-ol, 4-ethyl-1-octyne-3-ol, 3,7-dimethyl-2,6-octadiene-1- ol, 10-undecyne-1-ol, 2,4-undecadiene-1-ol, 2,4-dodecadiene-1-ol, 3-methyl-1-pentene-4-yn-3-ol, 1-ethynyl-1-cyclohexanol, 2-butene-1,4-diol, 2-butyne-1,4-diol, 3-butene-1,2-diol, 2-methylene-1,3-propanediol, 7-octene-1,2-diol, 2,5-dimethyl-3-hexyne-2,5-diol, 3,6-dimethyl-4-octyne-3,6-diol, 3-pentene-2-ol, 4-pentene-2-ol, 2-methyl-3-butene-1-ol, 5-hexene-2-ol, 3-methyl-1-pentene-3-ol, 4-methyl-3-pentene-1-ol, 4-methyl-2-cyclohexene-1-ol, 5-decene-1-ol, 3,7-dimethyl-6-octene-3-ol, 1,4-pentadiene-3-ol, 1,5-hexadiene-3-ol, 1,6-heptadiene-4-ol, 2-methyl-3-hexyne-2-ol, 1-ethynyl-1-cyclopentanol, 10-undecyne-1-ol, 1,5-hexadiene-3,4-diol, and 3,5-cyclohexadiene-1,2-diol.

Desirably, the aliphatic alcohols are contained within the range from 0.01 part by weight to 15 parts by weight against 100 parts by weight of the base component. Outside of this range, satisfactory results will not be attained or waste will result.

The coolant composition of the present invention may additionally contain an antifoaming agent, coloring agent, etc. A conventionally known rust inhibitor, such as molybdate, tungstate, sulfate, nitrate and/or benzoate may also be added in an amount that does not increase the electrical conductivity of the coolant of the present invention.

Embodiments and Comparisons

The coolant composition of the present invention is described hereunder using embodiments of the present invention. Table 1 shows the respective components of Embodiments 1 to 3 of the present invention and Comparisons 1 to 3. Embodiment 1 consisted of ethylene glycol, 3-butene-1-ol (aliphatic unsaturated alcohol), and deionized water. Embodiment 2 consisted of ethylene glycol, 4-pentene-1-ol (aliphatic unsaturated alcohol), and deionized water. Embodiment 3 consisted of ethylene glycol, 2,5-dimethyl-3-hexyne-2,5-diol (aliphatic unsaturated alcohol), and deionized water. Comparison 1 consisted of ethylene glycol and deionized water. Comparison 2 consisted of ethylene glycol, 1-butanol (aliphatic saturated alcohol), and ion exchanged water. Comparison 3 consisted of ethylene glycol, 1-pentanol (aliphatic saturated alcohol), and dedionized water.

TABLE 1

| Item | Embodiment 1 | Embodiment 2 | Embodiment 3 | Comparison 1 | Comparison 2 | Comparison 3 |
|---|---|---|---|---|---|---|
| | | | | | | (parts by weight) |
| ethylene glycol | 50 | 50 | 50 | 50 | 50 | 50 |
| water | 50 | 50 | 50 | 50 | 50 | 50 |
| 3-butene-1-ol | 0.5 | — | — | — | — | — |
| 4-pentene-1-ol | — | 0.5 | — | — | — | — |
| 1-butanol | — | — | — | — | 0.5 | — |
| 1-pentanol | — | — | — | — | — | 0.5 |
| 2,5-dimethyl-3-hexyne-2,5-diol | — | — | 0.5 | — | — | — |

The electrical conductivity after oxidation treatment of each embodiment and comparison was measured. The results are shown in Table 2. The oxidation treatment of each sample was performed over 168 hours at 100° C.

TABLE 2

| Item | Embodiment 1 | Embodiment 2 | Embodiment 3 | Comparison 1 | Comparison 2 | Comparison 3 |
|---|---|---|---|---|---|---|
| Initial conductivity (µS/cm) | 0.2 | 0.2 | 0.2 | 0.2 | 0.2 | 0.3 |
| Post oxidation conductivity (µS/cm) | 9.5 | 4.4 | 2.9 | 42.6 | 43.9 | 39.6 |

As Table 2 shows, Embodiments 1 to 3 and Comparisons 1 to 3 each had an initial electrical conductivity 0.3 µS/cm or below, while each of the electrical conductivities of Comparisons 1 to 3 after oxidation was much higher (42.6 for Comparison 1, 43.9 for Comparison 2, and 39.6 for Comparison 3). In contrast, the electrical conductivities of Embodiments 1 to 3 after oxidation all remained within the range from 0 µS/cm to 9.5 µS/cm (9.5 for Embodiment 1, 4.4 for Embodiment 2, and 2.9 for Embodiment 3).

Effects of the Invention

The aliphatic alcohol having unsaturated bonds in the molecules contained in the coolant composition of the present invention prevents generation of ionic substances as a result of oxidation of the base component of the coolant otherwise and is capable of maintaining the electrical conductivity of the coolant low for a long period of time. In addition, as the aliphatic alcohol in the coolant composition of the present invention is not easily removed by an ion exchanger in cooling systems, the duration of effectiveness of the ion exchanger is extended.

The invention claimed is:

1. A coolant composition for a fuel cell unit comprising a fuel cell unit coolant consisting essentially of a base component and 3-butene-1-ol, the base component containing at least one ingredient selected from glycol and water, wherein said 3-butene-1-ol is dissolved in said base component.

2. The coolant composition according to claim 1, wherein said 3-butene-1-ol is included from 0.01 part by weight to 15 parts by weight relative to 100 parts by weight of a base component.

3. The coolant composition according to claim 1, wherein said 3-butene-1-ol maintains electrical conductivity of the coolant at 10 µS/cm or below.

4. The coolant composition according to claim 1, wherein said 3-butene-1-ol maintains fluctuations in electrical conductivity of the coolant within the range from 0 µS/cm to 10 µS/cm.

5. A method of cooling a fuel cell unit comprising a cooling system, the method comprising adding the composition of claim 1 to the cooling system.

6. A method of making a fuel cell unit coolant composition according to claim 1, comprising mixing a glycolic base component with 3-butene-1-ol.

7. The method of claim 6, wherein said 3-butene-1-ol is included from 0.01 part by weight to 15 parts by weight relative to 100 parts by weight of the base component.

8. The method of claim 6, wherein said 3-butene-1-ol maintains the electrical conductivity of the coolant at 10 µS/cm or below.

9. The method of claim 6, wherein said 3-butene-1-ol maintains fluctuations in electrical conductivity of the coolant within the range from 0 µS/cm to 10 µS/cm.

10. A fuel cell unit comprising a fuel cell coolant system configured to circulate coolant within a fuel cell stack to cool fuel cells in the stack, with the coolant consisting essentially of a base component and 3-butene-1-ol, the base component containing at least one ingredient selected from glycol and water.

11. The fuel cell unit of claim 10, wherein said 3-butene-1-ol is included from 0.01 part by weight to 15 parts by weight relative to 100 parts by weight of a base component.

12. The fuel cell unit of claim 10, wherein the post oxidation electrical conductivity of the coolant is about 10 μS/cm or below.

13. The fuel cell unit of claim 10, wherein electrical conductivity fluctuations between initial conductivity of the coolant and post oxidation conductivity of the coolant range from 0 μS/cm to 10 μS/cm.

\* \* \* \* \*